(12) United States Patent
Wang

(10) Patent No.: US 9,955,163 B2
(45) Date of Patent: Apr. 24, 2018

(54) TWO PASS QUANTIZATION OF VIDEO DATA

(71) Applicant: GOOGLE INC., Mountain View, CA (US)

(72) Inventor: Yunqing Wang, Palo Alto, CA (US)

(73) Assignee: GOOGLE LLC, Mountain View, CA (US)

( * ) Notice: Subject to any disclaimer, the term of this patent is extended or adjusted under 35 U.S.C. 154(b) by 781 days.

(21) Appl. No.: 13/919,875

(22) Filed: Jun. 17, 2013

(65) Prior Publication Data
US 2015/0201190 A1    Jul. 16, 2015

(51) Int. Cl.
| | |
|---|---|
| H04N 7/12 | (2006.01) |
| H04N 11/02 | (2006.01) |
| H04N 11/04 | (2006.01) |
| H04N 19/124 | (2014.01) |
| H04N 19/176 | (2014.01) |
| H04N 19/132 | (2014.01) |
| H04N 19/136 | (2014.01) |
| H04N 19/194 | (2014.01) |
| H04N 19/86 | (2014.01) |

(52) U.S. Cl.
CPC ......... H04N 19/124 (2014.11); H04N 19/132 (2014.11); H04N 19/136 (2014.11); H04N 19/176 (2014.11); H04N 19/194 (2014.11); H04N 19/865 (2014.11)

(58) Field of Classification Search
CPC ... H04N 19/124; H04N 19/126; H04N 19/194
USPC ............................ 375/240.03, E7.139, E7.14
See application file for complete search history.

(56) References Cited

U.S. PATENT DOCUMENTS

| | | | |
|---|---|---|---|
| 7,301,999 B2 | 11/2007 | Filippini et al. | |
| 2005/0232362 A1* | 10/2005 | Lee | H04N 19/13 375/240.23 |
| 2007/0041653 A1* | 2/2007 | Lafon | H04N 19/117 382/250 |
| 2007/0285285 A1* | 12/2007 | Puri | H04N 19/105 341/50 |
| 2009/0175331 A1* | 7/2009 | Karczewicz | H04N 19/176 375/240.03 |
| 2010/0231599 A1* | 9/2010 | Tung | G06T 11/40 345/522 |

(Continued)

*Primary Examiner* — Tat C Chio
*Assistant Examiner* — Fabio S Lima
(74) *Attorney, Agent, or Firm* — Brake Hughes Bellermann LLP

(57) ABSTRACT

Disclosed is a method for encoding a block of video. The method includes identifying, by a processor, a transformed video data block including a plurality of transformed video data, identifying a first portion of the plurality of transformed video data, identifying a second portion of the plurality of transformed video data, determining a plurality of quantized values based on the second portion of the plurality of transformed video data, and generating a quantization coefficient data block including a first portion of a plurality of quantized data values corresponding to the first portion of the plurality of transformed video data and set to a default value and including a second portion of the plurality of quantized data values corresponding to the second portion of the plurality of transformed video data and set to the plurality of quantized values.

15 Claims, 11 Drawing Sheets

(56) References Cited

U.S. PATENT DOCUMENTS

| | | | | |
|---|---|---|---|---|
| 2012/0230417 A1* | 9/2012 | Sole Rojals | ..... | H04N 19/00109 375/240.18 |
| 2013/0028329 A1* | 1/2013 | Lou | ...................... | H04N 19/176 375/240.18 |
| 2013/0058407 A1* | 3/2013 | Sole Rojals | ........... | H04N 19/13 375/240.12 |
| 2013/0182757 A1* | 7/2013 | Karczewicz | ........... | H04N 19/70 375/240.02 |
| 2013/0272386 A1* | 10/2013 | Yu | .................... | H04N 19/00096 375/240.03 |
| 2013/0322547 A1* | 12/2013 | Lou | ........................ | H04N 19/91 375/240.24 |

* cited by examiner

575

| | 0 QD | 1 QD | 2 QD | 3 QD | 4 QD | 5 QD | 6 QD | 7 QD |
|---|---|---|---|---|---|---|---|---|
| | 8 QD | 9 QD | 10 QD | 11 QD | 12 QD | 13 QD | 14 QD | 15 0 |
| | 16 QD | 17 QD | 18 QD | 19 QD | 20 QD | 21 QD | 22 0 | 23 0 |
| | 24 QD | 25 QD | 26 QD | 27 QD | 28 QD | 29 0 | 30 0 | 31 0 |
| | 32 QD | 33 QD | 34 QD | 35 QD | 36 0 | 37 0 | 38 0 | 39 0 |
| | 40 QD | 41 QD | 42 QD | 43 0 | 44 0 | 45 0 | 46 0 | 47 0 |
| | 48 QD | 49 QD | 50 0 | 51 0 | 52 0 | 53 0 | 54 0 | 55 0 |
| | 56 QD | 57 0 | 58 0 | 59 0 | 60 0 | 61 0 | 62 0 | 63 0 |

Low Frequency ↓ High Frequency

580

Low Frequency →  High Frequency

FIG. 5C

TWO PASS QUANTIZATION OF VIDEO DATA

BACKGROUND

In modern video compression technology, a source video frame is often divided into rectangular or square blocks. For each block, motion estimation is done in order to find the best matched prediction block in reference frames that have the smallest rate and distortion errors. As a result, systems typically achieve high compression ratios while retaining acceptable video quality. In order to evaluate a candidate prediction block, residual data of prediction blocks are processed as follows (1) forward transform, (2) quantization, (3) de-quantization, (4) inverse transform, and (5) reconstruction. The reconstructed data is then compared with the source data to compute the distortion error.

In some applications, an encoder typically processes a large number of candidate prediction blocks to find the best match. In addition, the quantization process is one of the most heavily called functions. For example, the quantization process typically utilizes 10% or even 20% of the encoding time.

A more efficient (e.g., faster) video encoder is needed to save computing resources during compression. In some applications, such as video conferencing, an efficient encoder is essential. In order to provide a more efficient video encoder, a more efficient quantization process is needed.

SUMMARY

Embodiments relate to encoding video data. More specifically, embodiments relate to quantizing transformed video data.

One embodiment includes a method for encoding a block of video. The method includes identifying, by a processor, a transformed video data block including a plurality of transformed video data, identifying a first portion of the plurality of transformed video data, identifying a second portion of the plurality of transformed video data, determining a plurality of quantized values based on the second portion of the plurality of transformed video data, and generating a quantization coefficient data block including a first portion of a plurality of quantized data values corresponding to the first portion of the plurality of transformed video data and set to a default value and including a second portion of the plurality of quantized data values corresponding to the second portion of the plurality of transformed video data and set to the plurality of quantized values.

Another embodiment includes a method for encoding a block of video. The method includes processing, by a processor, in a reverse scan order, each of a plurality of transformed video data defining a transformed video data block, the reverse scan order being opposite a quantization scan order, identifying a position of a data value from the plurality of transformed video data that is greater than a magnitude of a variable, the magnitude of the variable being based on a compression quality level, processing in the quantization scan order and after the identifying, at least a portion of the plurality of transformed video data, and terminating the processing in the quantization scan order at the position of the data value.

Still another embodiment includes a method for encoding a block of video. The method includes processing, by a processor, in a scan order, each of a plurality of transformed video data defining a transformed video data block, storing a data value pair including a first value indicating a scan order position and a second value associated with a video data of the plurality of transformed video data at the scan order position to a memory upon determining the second value is greater than a magnitude of a variable, the magnitude of the variable being based on a compression quality level, processing each of the data value pairs, and setting one of a plurality of quantized data values of a quantization coefficient data block based on the processed data value pairs.

BRIEF DESCRIPTION OF THE DRAWINGS

Example embodiments will become more fully understood from the detailed description given herein below and the accompanying drawings, wherein like elements are represented by like reference numerals, which are given by way of illustration only and thus are not limiting of the example embodiments and wherein:

FIG. 5C illustrates a quantization data block according to at least one example embodiment.

Figure 1:
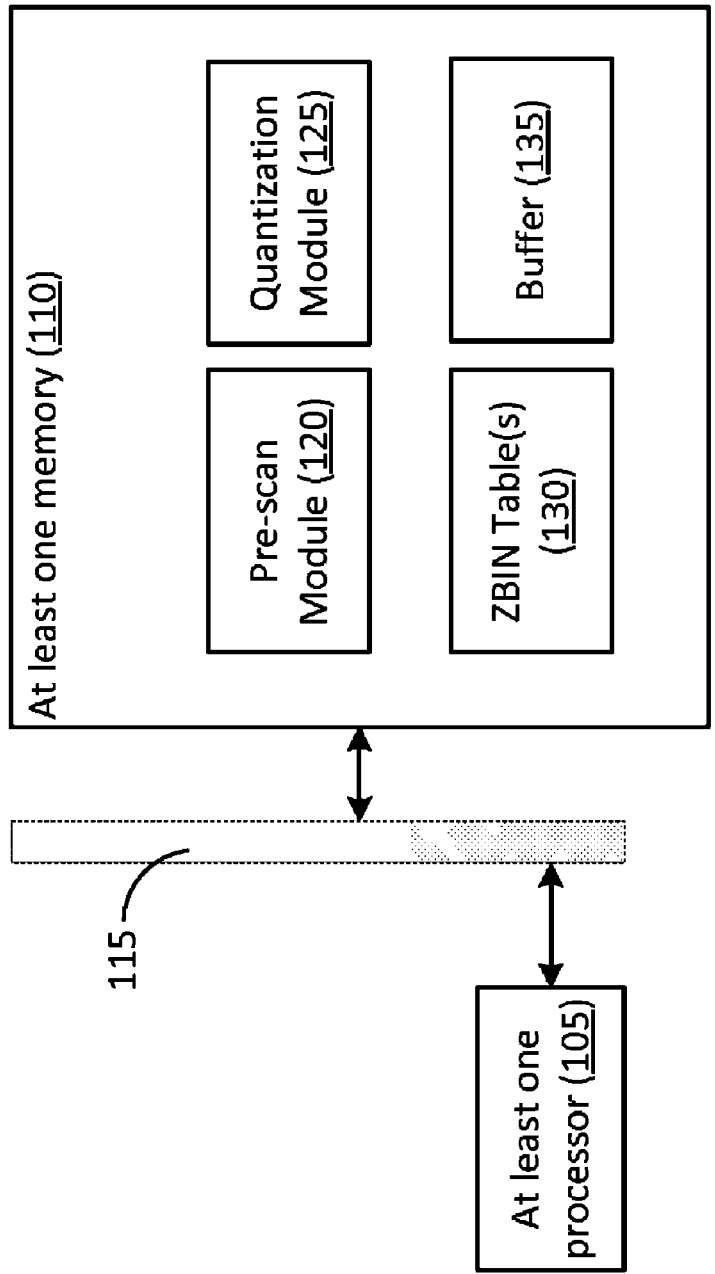
FIG. 1 illustrates a video encoder apparatus according to at least one example embodiment.

It should be noted that these figures are intended to illustrate the general characteristics of methods and/or structure utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments.

DETAILED DESCRIPTION OF THE EMBODIMENTS

While example embodiments may include various modifications and alternative forms, embodiments thereof are shown by way of example in the drawings and will herein be described in detail. It should be understood, however, that there is no intent to limit example embodiments to the particular forms disclosed, but on the contrary, example embodiments are to cover all modifications, equivalents, and alternatives falling within the scope of the claims.

A coded video block may be represented by prediction information that can be used to create or identify a prediction block, and a residual block of data indicative of differences between the block being coded and the prediction block. One or more motion vectors may be used to identify the prediction block of data (e.g., from a previous or subsequent video frame of a video sequence).

A video encoder may apply a transform and quantization to a coding process (amongst other steps) to further reduce the bit rate associated with communication of the residual block. Transform techniques may include, for example, discrete cosine transforms (DCT) or similar processes. For example, transform techniques may include wavelet transforms, integer transforms, or other types of transforms. In a DCT process, for example, the transform process may convert a set of pixel values into transform coefficients, which may represent the energy of the pixel values in the frequency domain. Quantization may be applied to the transform coefficients. Quantization may involve performing a process to limit the number of bits associated with any given transform coefficient based on, for example, a desired or target quality of video when the video is decoded. A further step may include, for example, compressing the quantized transform coefficients.

FIG. 1 illustrates a video encoder apparatus according to at least one example embodiment. As shown in FIG. 1, the video encoder apparatus 100 includes at least one processor 105 and at least one memory 110. The at least one processor 105 and the at least one memory 110 are communicatively coupled via bus 115. The at least one memory 110 includes a pre-scan module 120, a quantization module 125, a ZBIN table(s) 130, and a buffer 135.

Figure 2:
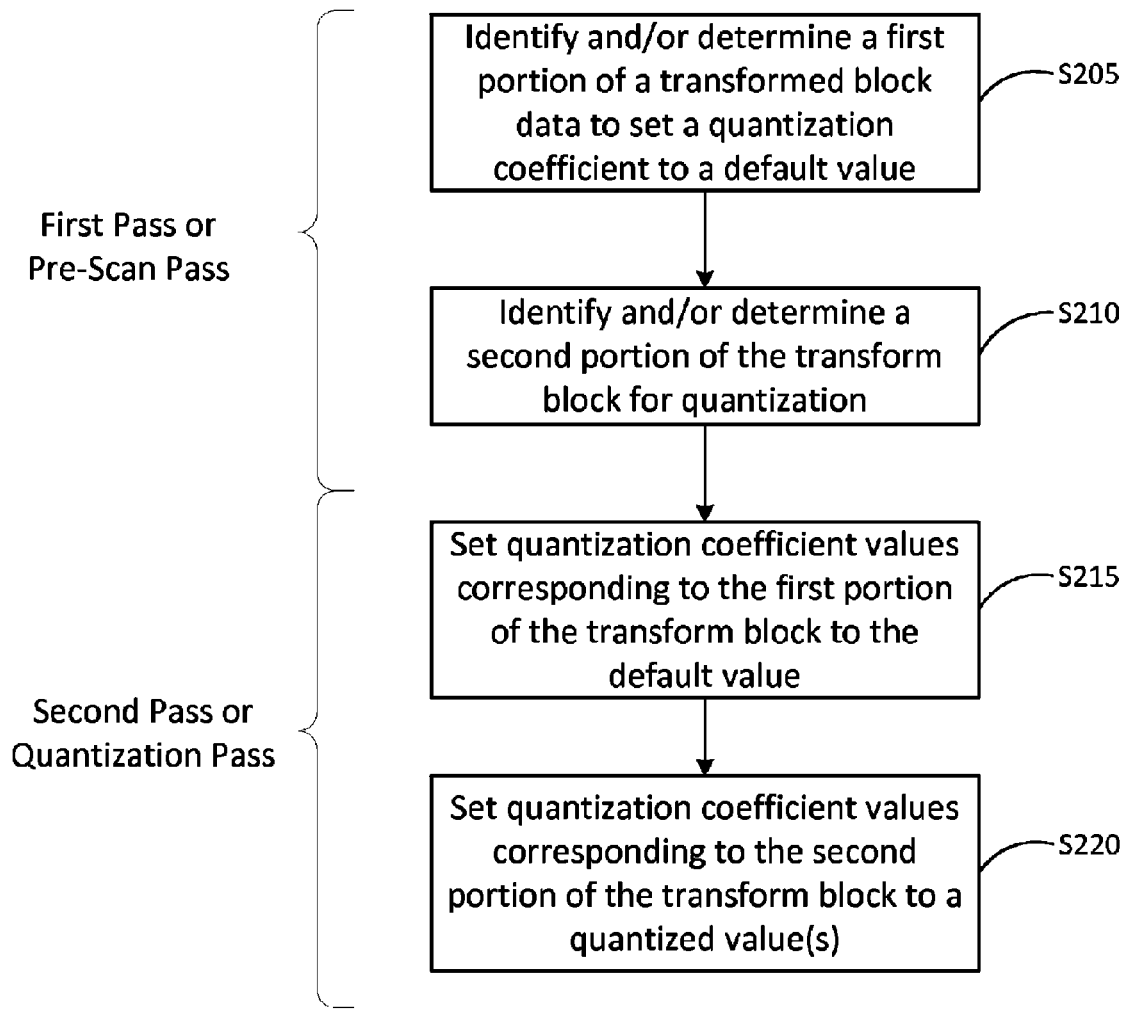
FIG. 2 illustrates a method for encoding a video data block according to at least one example embodiment.

A new efficient two-pass quantization algorithm is proposed, which does the quantization in two passes as shown in FIG. 2. The first pass is a quick pre-scan of transform coefficients, and the second pass is the actual quantization pass. The pre-scan module 120 does the first pass (which can be referred to as a pre-scan pass), the quantization module 125 does a second pass that is the actual quantization pass.

Accordingly, during the first pass the video encoder apparatus 100 can identify and/or discard some portions of a transform block that don't need to be processed during the second pass. The video encoder apparatus 100 can further identify, during the first pass, the portions of the transform block that should be further processed. A more efficient quantization algorithm is the result. The scanning during the first pass can be in a first direction, the scanning during the second pass can be in a second direction or opposite direction. The first pass and the second pass are based on ZBIN values stored in the ZBIN table(s) 130. Specifically, the quantity of data during the second pass can be based on the processing during the first pass. The quantity of data during the second pass can be based on desired quality.

The at least one processor 105 may be configured to execute computer instructions associated with the pre-scan module 120 and/or the quantization module 125. The at least one processor 105 may be a shared resource. For example, the video encoder apparatus 100 may be an element of a larger system (e.g., a mobile device, a personal computer or a server). Therefore, the at least one processor 105 may be configured to execute computer instructions associated with other elements (e.g., web browsing or wireless communication) within the larger system.

The at least one memory 110 may be configured to store data and/or information associated with the video encoder apparatus 100. For example, the at least one memory 110 may be configured to store data tables including, for example, the ZBIN table(s) 130. The at least one memory 110 may be a shared resource. For example, the video encoder apparatus 100 may be an element of a larger system (e.g., mobile device, a personal computer or a server). Therefore, the at least one memory 110 may be configured to store data and/or information associated with other elements (e.g., web browsing or wireless communication) within the larger system.

The pre-scan module 120 may be configured to perform a scan (e.g., during the first pass or pre-scan pass) of a transformed video block to determine and/or identify a first portion of the transformed video block to set a quantization coefficient to a default value and a second portion of the transformed video block to set a quantization coefficient to a quantized value. Further details of the pre-scan module 120 are be described with regard to the methods further detailed below.

The quantization module 125 may be configured to process transformed video block data (e.g., transform coefficients) to determine (e.g., during the second pass or quantization pass) the quantized value of the second portion identified by the pre-scan module 120. The quantization module 125 may be configured to generate a quantization coefficient block including data values (e.g., data stored as bits and/or bytes) corresponding to data values of the process transformed video block. The data values including one of the default value or the determined quantized value.

The ZBIN table(s) 130 may be configured to store ZBIN values. In quantization processes, transform coefficients may be processed in a defined scan order such as zigzag order instead of raster order (i.e. linebyline order). In order to better allocate the available bits, a ZBIN is adopted to attenuate coefficients near zero. For example, if a transform coefficient is out of the ZBIN range, the transform coefficient may be quantized and stored in the quantized coefficient block or buffer, otherwise (or in addition), the quantized transform coefficient may be set to a default value (e.g., zero). The ZBIN may include two parts (e.g., portions): a constant base ZBIN and a varying boost. For a specific coefficient, the varying boost part may be determined by the number of continuous zero quantized transform coefficients since the last non-zero quantized coefficient. However, the varying boost part is typically small as compared to the constant base ZBIN.

ZBIN values may be based on, or selected based on, a quantization parameter (Q). Higher values for the quantization parameter Q typically result in more quantization and higher video compression. As a result, a higher value of the quantization parameter Q may result in lower quality and a lower bit rate of a communicated video. By contrast, lower values for the quantization parameter Q typically result in less quantization. As a result, a lower value of the quantization parameter Q may result in higher quality video and a higher bit rate. Therefore, the quantization parameter Q may be based on a target (and/or desired) video quality, bit rate, and/or compression quality level. Accordingly, ZBIN values from the ZBIN table(s) 130 may be based on a target (and/or desired) video quality, bit rate, and/or compression quality level.

ZBIN values may be used by the pre-scan module 120 and the quantization module 125 during the first pass and the second pass. According to example embodiments, the ZBIN table(s) 130 may store separate ZBIN values for use by the pre-scan module 120 and the quantization module 125. In other words, there may be separate (e.g., different) ZBIN table(s) 130 associated with (and therefore, different ZBIN values for use by) the pre-scan module 120 and the quantization module 125.

The buffer 135 may be used to store in-process data associated with the pre-scan module 120 and the quantization module 125. For example, the buffer 135 may store an index value or a position value and/or one or more transform coefficient values as determined by the pre-scan module 120 for later use by the quantization module 125.

FIG. 2 illustrates a method for encoding a video block according to at least one example embodiment. The method steps described with regard to FIG. 2 may be executed as software code stored in a memory (e.g., at least one memory 110) associated with a video encoder apparatus (e.g., as shown in FIG. 1) and executed by at least one processor (e.g., processor 105) associated with the video encoder apparatus. However, alternative embodiments are contemplated such as a video encoder embodied as a special purpose processor.

For example, the method steps may be performed by an application-specific integrated circuit, or ASIC. For example, the ASIC may be configured as a pre-scan module 120 and/or a quantization module 125. Although the steps described below are described as being executed by a processor, the steps are not necessarily executed by a same processor. In other words, at least one processor may execute the steps described below with regard to FIG. 2.

As shown in FIG. 2, in step S205, during a first pass or pre-scan pass, a processor (e.g., processor 105) determines or identifies a first portion of a transformed data block to set a quantization coefficient to a default value. For example, the processor may pre-scan (e.g., implement functionality of the pre-scan module 120) to determine if any data values (e.g., data stored as bits and/or bytes) of the transformed video data block represent transformation coefficients that are at or below a compression quality level. The compression quality level may be a ZBIN value or based on a ZBIN value (e.g., a value read from the ZBIN table(s) 130). The first portion of the transformed data block may be the data values (or a subset of the data values) that are determined to be at or below the compression quality level.

In step S210, during a first pass or pre-scan pass, the processor determines or identifies a second portion of the transformed video data block for quantization. For example, as discussed above, the processor may pre-scan (e.g., implement functionality of the pre-scan module 120) to determine if any data values of the transformed video data block represent transformation coefficients that are at or below a compression quality level. The second portion of the transformed data block may be the data values (or a subset of the data values) that are determined not to be at or below the compression quality level.

In step S215, during a second pass or quantization pass, the processor sets quantization coefficient values corresponding to the first portion of the transformed video data block to the default value. For example, the processor (e.g., implementing functionality of the quantization module 125) may generate a quantization data block. The processor may determine a mapping of data values from the transformed video data block to the quantization data block. The data values of the quantization data block corresponding to the first portion of the transformed video data block may be set to the default value. For example, the data values of the quantization data block corresponding to the first portion of the transformed video data block may be set to zero (0).

In step S220, during a second pass or quantization pass, the processor sets quantization coefficient values corresponding to the second portion of the transformed data block to a quantized value(s) value. For example, the processor (e.g., implementing functionality of the quantization module 125), may read transform coefficients from the transformed video data block corresponding to the second portion of transformed video data block and determine quantized values of the transform coefficients. The data values of the quantization data block corresponding to the second portion of the transformed video data block may be set to the quantized values of the transform coefficients.

Figure 3A:
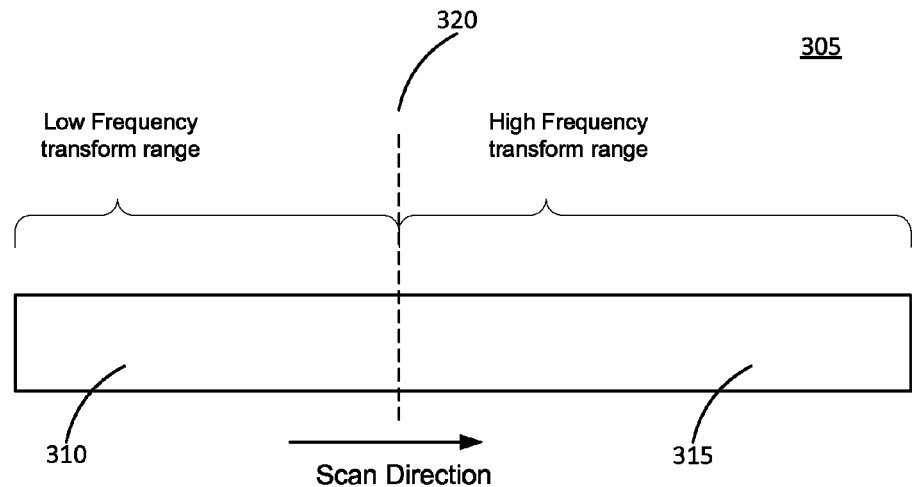
FIGS. 3A and 3B illustrate a transformed video data block according to at least one example embodiment.
Figure 3B:
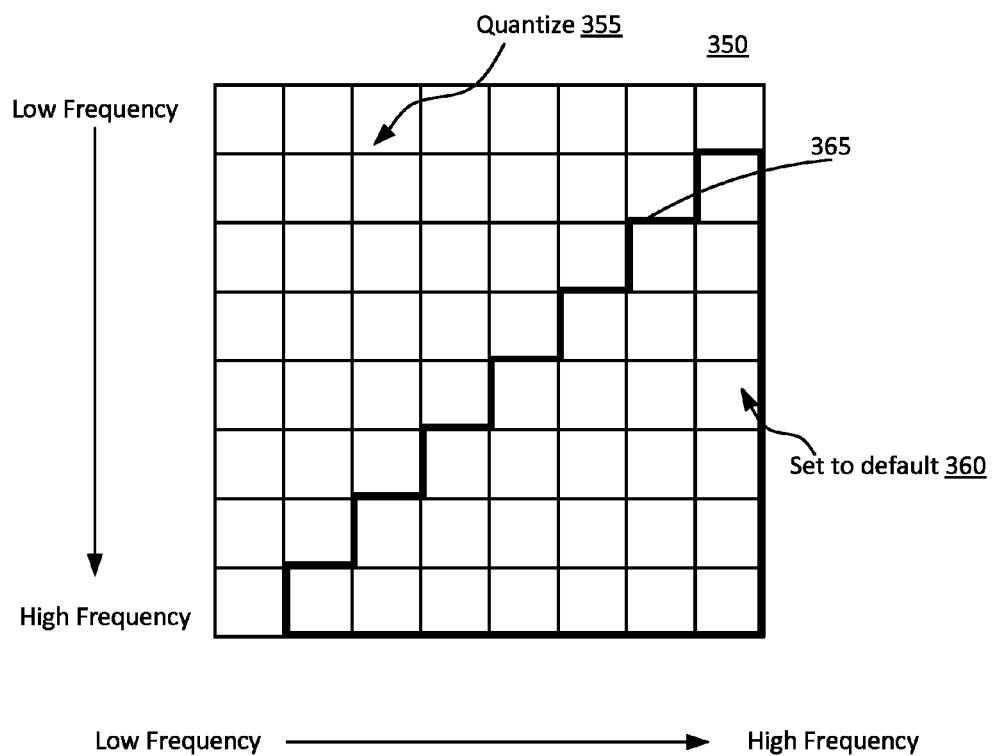

FIGS. 3A and 3B illustrate a transformed video data block according to at least one example embodiment. As shown in FIG. 3A, the transformed video data block 305 is shown as a linear block of data. The transformed video data block 305 includes a first portion 310 and a second portion 315. The first portion 310 may be associated with relatively low frequency transform data. The second portion 315 may be associated with relatively high frequency transform data. A line 320, distinguishing between the first portion 310 and the second portion 315, may be associated with a target (and/or desired) compression quality level. For example, a higher quality decoded video may include more high frequency transform data than a lower quality video. Therefore, as the line 320 shifts into the second portion 315, the quality of the video may increase. By contrast, as the line 320 shifts into the first portion 310, the quality of the video may decrease.

The compression quality level, which can be used to determine the position of the line 320, may be a ZBIN value or based on a ZBIN value (e.g., a value read from the ZBIN table(s) 130). Therefore, changing the ZBIN value may shift the line 320 such that more or less high frequency transform data is included in the first portion 310.

A scan direction (e.g., as indicated by an arrow directed away from the first portion 310 and toward the second portion 315) may indicate an order in which data values (e.g., data stored as bits and/or bytes) are scanned (i.e., a scan order). For example, data values may be scanned for the purpose of quantizing the transformed video data block. Quantizing transform coefficients is shown as being performed in a low frequency coefficient to high frequency coefficient order. Other orders are contemplated. For example, a high frequency to low frequency order, a random order and/or a zigzag order. Other purposes for scanning data values are contemplated. For example, data values may be scanned for display purposes, data values may be scanned to determine changes in a data value as compared to a another block and/or data values may be scanned in a pre-scan.

As shown in FIG. 3B, the transformed video data block 350 is shown as an 8×8 array or block of data. Other block sizes are also relevant to this disclosure. For example, 4×4, 4×8, 16×16, 8×16, 32×32 and larger block sizes may be relevant. The transformed video data block 350 includes a first or quantized portion 355 and a second or set to default portion 360. The first portion 355 may be associated with low (or lower) frequency transform data than the second portion 360. The line 365 distinguishing between the first portion 355 and the second portion 360 may be associated with a target (and/or desired) compression quality level. For example, a higher quality decoded video may include more high frequency transform data than a lower quality video. Therefore, as the line 365 shifts into the second portion 360, the quality of the video may increase. By contrast, as the line 365 shifts into the first portion 355, the quality of the video may decrease.

The compression quality level may be a ZBIN value or based on a ZBIN value (e.g., a value read from the ZBIN table(s) 130). Therefore, changing the ZBIN value may shift the line 365 such that more or less high frequency transform data is included in the first portion. According to example embodiments, performance (and/or efficiency) of a quantization step may be improved (e.g., processor resources reduced) by quantizing the first portion of the transform data and not quantizing, setting to a default value or setting to zero the second portion of the transform data.

Figure 4A:
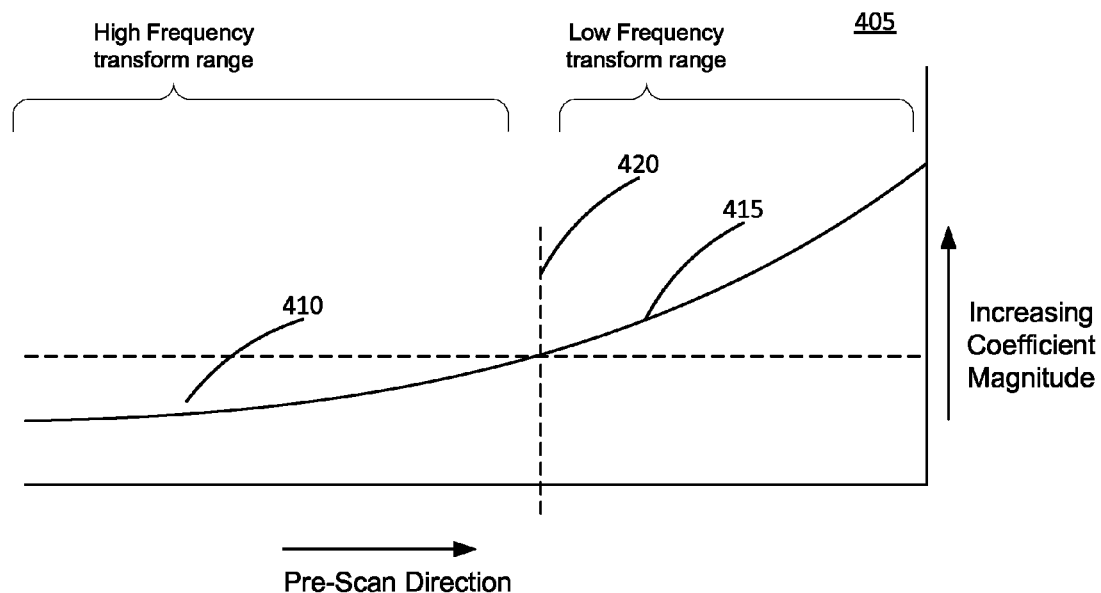
FIGS. 4A and 4B illustrate a pre-scan direction of a transformed video data block according to at least one example embodiment.
Figure 4B:
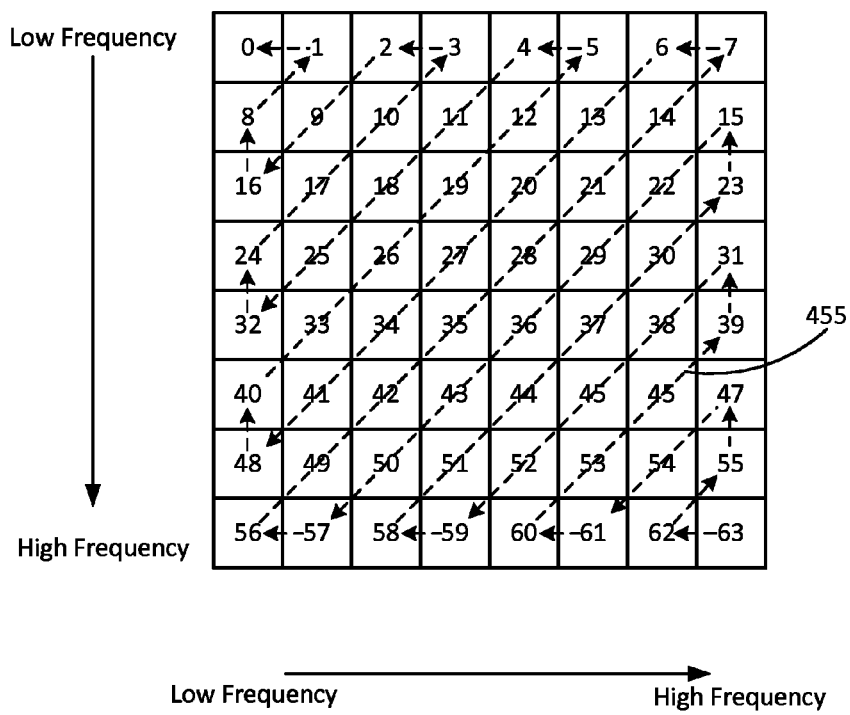

FIGS. 4A and 4B illustrate a pre-scan direction of a transformed video block 405 according to at least one example embodiment. As shown in FIG. 4A, the transformed video data block 405 may be a linear block of data (as described with above with regard to the transformed video data block 305). In a pre-scan of the transformed video data block 405, the direction of the pre-scan may be in a scan order that is opposite of (or substantially opposite of), for example, a quantization scan order. The pre-scan order may also be referred to as a reverse scan order. Therefore, as shown in FIG. 4A, the pre-scan scan direction (or scan order) may be from high frequency transform data 410 to low frequency transform data 415. A line 420 distinguishing between the high frequency transform data 410 and the low frequency transform data 415 may be associated with a compression quality level. For example, a higher quality decoded video may include more high frequency transform data than a lower quality video. Therefore, as the line 420 shifts into the high frequency transform data 410 range, the quality of the video may increase. By contrast, as the line 420 shifts into the low frequency transform data 415, the quality of the video may decrease.

As shown in FIG. 4B, the transformed video data block 450 may be an 8×8 array or block of data (as described with above with regard to the transformed video data block 350). Scanning data values (e.g., data stored as bits and/or bytes) in the transformed video data block 450 may be done in a zig-zag order. In a pre-scan of the transformed video data block 450, the direction of the pre-scan may be in a scan order that is opposite of (or substantially opposite of), for example, a quantization scan order. Therefore, as shown in FIG. 4B, the pre-scan scan direction (or scan order) may zig-zag from high frequency transform data (e.g., the block indicated as position 63) to low frequency transform data (e.g., the block indicated as position 0) in a scan order as indicated by the dashed line 455. The pre-scan order may also be referred to as a reverse scan order.

According to example embodiments, a pre-scan may interrupted at, for example, a data value in the transformed video data block represented by the line 420. Alternatively, the pre-scan may interrupted at, for example, a data value in the transformed video data block with a transform coefficient value greater than the compression quality level and/or ZBIN value (see also line 365 shown in FIG. 3B). The index value or the position value of the data value where the pre-scan was interrupted may be stored for use in a quantization process of the transformed video data block. For example, referring to FIG. 4B, the pre-scan may be interrupted at the block indicated as position 56 if the transformed video data block 350 is transposed on the transformed video data block 450.

The ZBIN may include two parts: a constant base ZBIN and a varying boost. For a specific coefficient, the boost part may be determined by the number of continuous zero quantized coefficients since the last nonzero quantized coefficient.

Figure 5A:
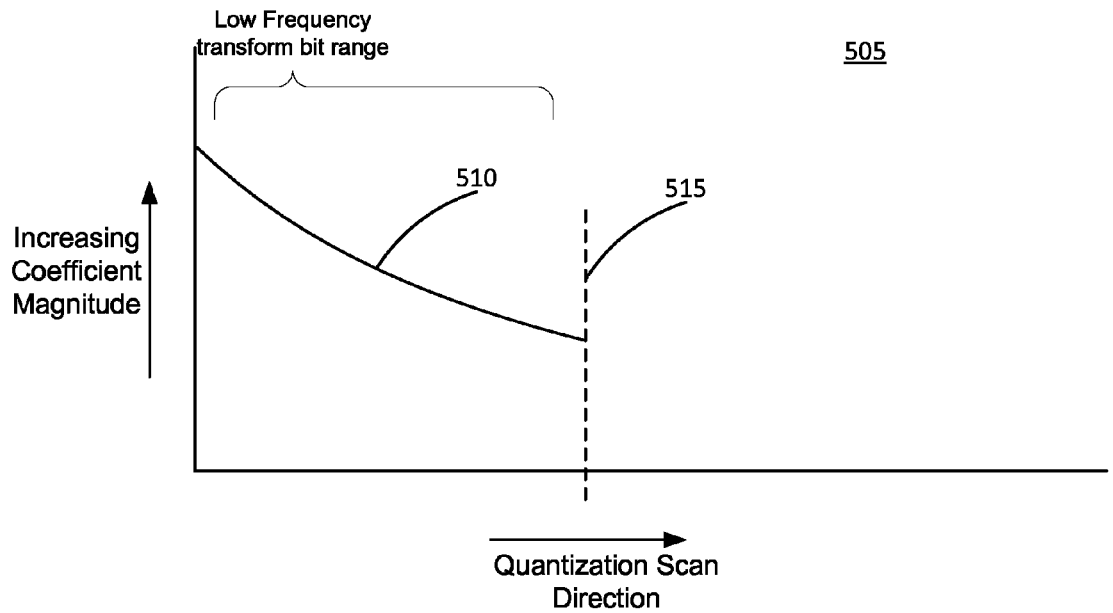
FIGS. 5A and 5B illustrate a quantization scan direction of a transformed video data block according to at least one example embodiment.
Figure 5B:
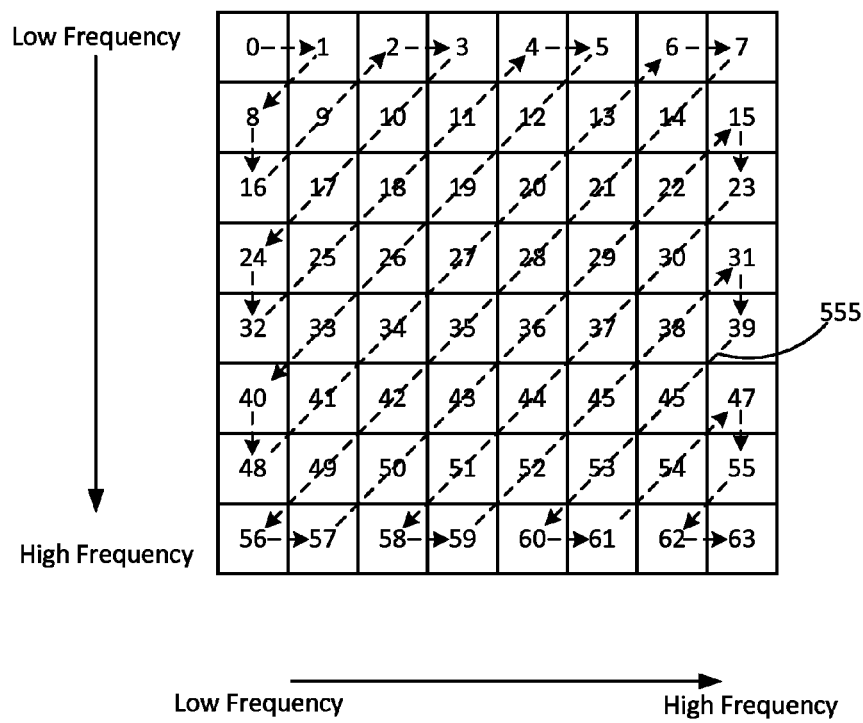

FIGS. 5A and 5B illustrate a quantization scan direction of a transformed video block according to at least one example embodiment. As shown in FIG. 5A, the transformed video data block 505 may be a linear block of data (as described with above with regard to the transformed video data block 305). In a quantization scan of the transformed video data block 505, the direction of the scan may begin with low frequency transform data 510. However, according to example embodiments, the quantization scan may be interrupted. For example, the quantization scan may be interrupted at line 515. Line 515 may represent the index or position value of the data value where the pre-scan was interrupted.

As shown in FIG. 5B, the transformed video data block 550 may be an 8×8 array or block of data (as described with above with regard to the transformed video data block 350). Scanning data values (e.g., data stored as bits and/or bytes) in the transformed video data block 550 may be done in a zigzag order. In a quantization scan of the transformed video data block 550, the scan direction (or scan order) may zigzag from low frequency transform data (e.g., the block indicated as position 0) to high frequency transform data (e.g., the block indicated as position 63) in a scan order as indicated by the dashed line 555. As discussed above, the quantization scan may be interrupted at the index or position value of the data value where the pre-scan was interrupted.

For example, as shown in FIG. 5C, the quantization scan may be interrupted at the block indicated as position 56 resulting in the quantization data block 575. As shown in FIG. 5C, positions up and to the left of line 580 include quantized data (QD). Whereas positions down and to the right of the line 580 include default data (0). Referring to FIG. 4B, during the pre-scan pass position 56 becomes the first position in the transform video data block 450 with a data value that is greater than the pre-scan ZBIN value. Accordingly, referring to FIG. 5B, during the quantization pass position 56 becomes the last position in the transform video data block 550 that is quantized. This combination of pre-scan pass and quantization pass may result in the quantization data block 575.

One embodiment includes a method for encoding a block of video. The method includes identifying, by a processor, a transformed video data block including a plurality of transformed video data, identifying a first portion of the plurality of transformed video data, identifying a second portion of the plurality of transformed video data, determining a plurality of quantized values based on the second portion of the plurality of transformed video data, and generating a quantization coefficient data block including a first portion of a plurality of quantized data values corresponding to the first portion of the plurality of transformed video data and set to a default value and including a second portion of the plurality of quantized data values corresponding to the second portion of the plurality of transformed video data and set to the plurality of quantized values.

The method steps described with regard to FIGS. 6-9 may be executed as software code stored in a memory (e.g., at least one memory 110) associated with a video encoder apparatus (e.g., as shown in FIG. 1) and executed by at least one processor (e.g., processor 105) associated with the video encoder apparatus. However, alternative embodiments are contemplated such as a video encoder embodied as a special purpose processor.

For example, the method steps may be performed by an application-specific integrated circuit, or ASIC. For example, the ASIC may be configured as a pre-scan module 120 and/or a quantization module 125. Although the steps described below are described as being executed by a processor, the steps are not necessarily executed by a same processor. In other words, at least one processor may execute the steps described below with regard to FIGS. 6-9.

Figure 6:
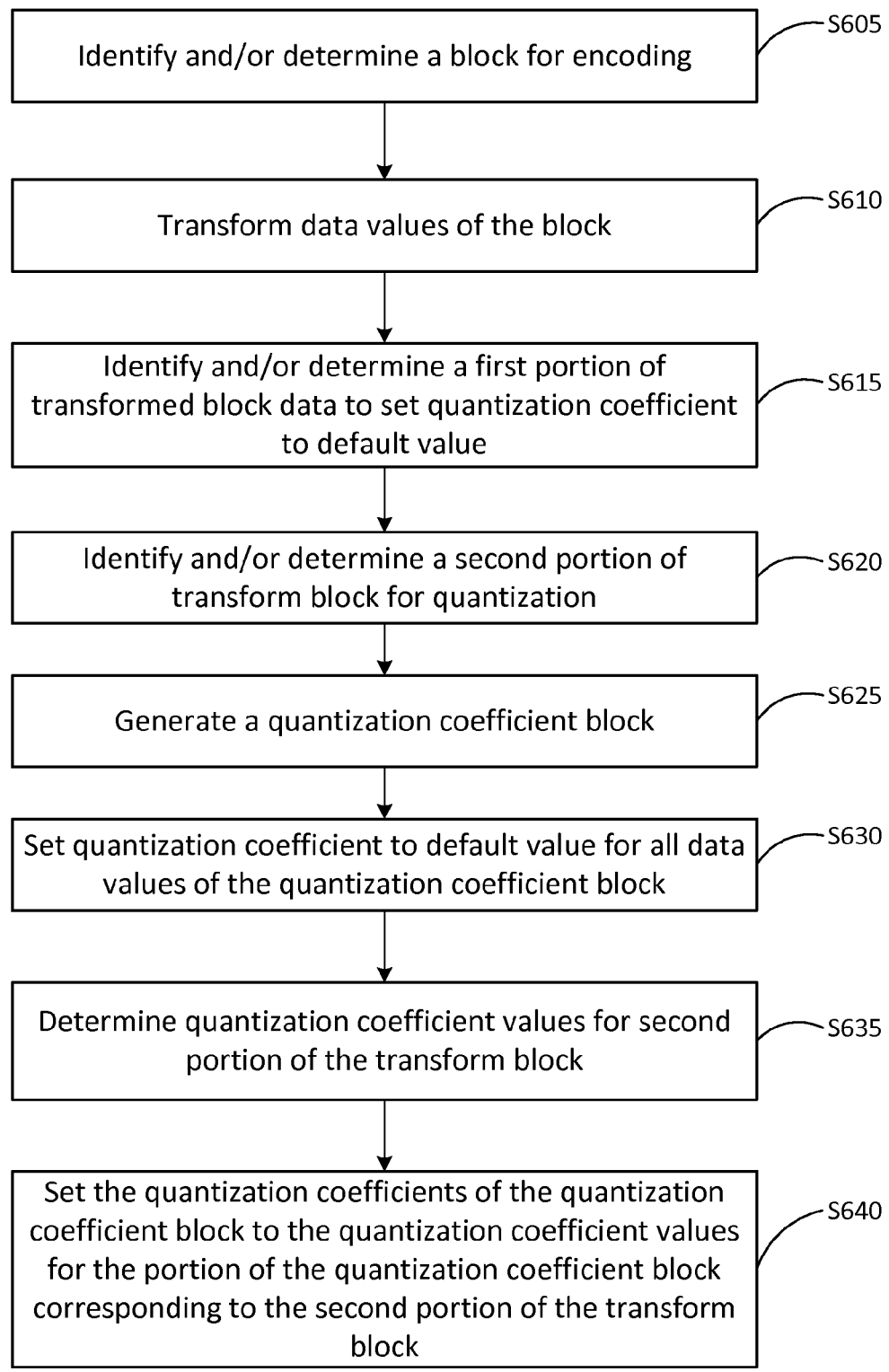
FIG. 6 illustrates a method for encoding a video data block according to at least one example embodiment.

FIG. 6 illustrates a method for encoding a video block according to at least one example embodiment. As shown in FIG. 6, in step S605 a processor (e.g., processor 105) determines and/or identifies a block for encoding. For example, the block for encoding may be a next block in a sequence of residual blocks of a streaming video (e.g., a video conference, movie and/or television show) for transmission over a wired and/or wireless communication system.

In step S610 the processor transforms data values (e.g., data stored as bits and/or bytes). For example, the processor may transform the residual block from a first domain (e.g., the time domain) to a second domain (e.g., the frequency domain) using one or more transform techniques, for example, a discrete cosine transform (DCT). The processor may save (or store) this transformed video data block in a memory (e.g., at least one memory 110) or a buffer (e.g., buffer 135) for additional processing.

In step S615 the processor identifies and/or determines a first portion of a transformed video data block to set a quantization coefficient to a default value. For example, the first portion of the transformed video data block may include data values having a value less than (or less than or equal to) a quality value. The quality value may be a compression quality level. The compression quality level may be a ZBIN value or based on a ZBIN value (e.g., a value read from the ZBIN table(s) 130). The ZBIN value may be a pre-scan ZBIN value. The pre-scan ZBIN value may be different from (e.g., read from a different ZBIN table(s) 130) a quantization ZBIN value. The pre-scan ZBIN value may be the base ZBIN. The base ZBIN may be directly proportional to the quantization parameter Q, namely, base ZBIN=K*Q, where K is a constant. Q for a block is picked by a rate control algorithm, based on the given target bit rate, and the local motion complexity (e.g., more bits are allocated to high motion area than low motion area). The base ZBIN may not change during a quantization process, and may be used to find the dividing position of first portion and second portion in pre-scan pass. The quantization ZBIN, used in the quantization pass, may be the sum of the base ZBIN and the boost part, which may be calculated during the quantization pass.

The processor may pre-scan (e.g., implementing functionality of the pre-scan module 120) the transformed video data block to determine whether or not the data value is less than (or less than or equal to) the quality value (e.g., compression quality value). The processor may process or scan the transformed video data block in a pre-scan direction (or scan order) as described above (see FIGS. 4A and 4B). The processor may terminate the pre-scan and save a data value position or index upon determining the data value is greater than (or greater than or equal to) the quality value (e.g., compression quality value). The processor may save a data value position or index and a transform coefficient value to a buffer (e.g., buffer 135) upon determining the data value is greater than (or greater than or equal to) the quality value (e.g., compression quality value). The first portion of the transformed video data block may be associated with, for example, the second portion 315 (see FIG. 3A), the second or set to default portion 360 (see FIG. 3B), and/or the high frequency transform data 410 (see FIG. 4A)

In step S620 the processor identifies and/or determines a second portion of the transformed video data block to quantize associated data. For example, as discussed above, the processor may pre-scan (e.g., implementing functionality of the pre-scan module 120) to determine if any data values of the transformed video data block represent transformation coefficients that are at or below a compression quality level. The second portion of the transformed data block may be the data values (or a subset of the data values) that are determined not to be at or below the compression quality level.

In step S625 the processor generates a quantization coefficient block. For example, the processor may generate a block with dimensions the same as the transformed video data block. The processor may store the block in a memory (e.g., at least one memory 110) or a buffer (e.g., buffer 135). For example, the processor may reserve a block of memory in at least one memory 110 and associate the block of memory (e.g., assign a handle, name or pointer) to the quantization coefficient block.

In step S630 the processor sets quantization coefficients of the quantization coefficient block to a default value for all (substantially all or most) data values of the quantization coefficient block. For example, the processor may set each data value stored or reserved in memory and associated with the quantization coefficient block to the default value. The default value may be zero (0).

In step S635 the processor determines quantization coefficient values for the second portion of the transformed video data block. For example, the processor (e.g., implementing functionality of the quantization module 125) may process or read each data value representing a transform coefficient from the transformed video data block. Processing or reading each data value may include processing or scanning, in a quantization direction, each data value of the transformed video data block. Processing or scanning data values in the transformed video data block may be done in a zigzag order. In a quantization scan of the transformed video data block, the scan direction (or scan order) may zigzag from low frequency transform data (e.g., the block indicated as position 0 in FIG. 5B) to high frequency transform data (e.g., the block indicated as position 63 in FIG. 5B) in a scan order (as indicated by the dashed line 555 in FIG. 5B). As discussed above, the quantization scan may be interrupted at the index or position of the data value where the pre-scan was interrupted. For example, the quantization scan may be interrupted at a data value delineating the first portion of the transformed video data block and the second portion of transformed video data block. Processing or reading each data value may include processing or reading, for example, buffer 135 to determine position or index and transform coefficient pairs for quantization.

The processor may quantize (e.g., implementing functionality of the quantization module 125) the processed or read data value based on the value of the data value, a quantization parameter Q, a quantization ZBIN value (as read from ZBIN table(s) 130) and a quantization algorithm. The quantization algorithm may be, for example, a mapping of a large set of input values (e.g., transform coefficients) to a smaller set of values (e.g., rounding values to some unit of precision and/or compressing a range of values to a single quantum value). In other words, the quantization algorithm may map a range of transform coefficients to a single value. The mapping may be based on the quantization parameter Q and the quantization ZBIN value (e.g., a size of the range may be based on the quantization parameter Q and the quantization ZBIN value).

In step S640 the processor sets the quantization coefficients of the quantization coefficient block to the quantization coefficient values for the portion of the quantization coefficient block corresponding to the second portion of the transformed video data block. For example, as the processor quantizes each coefficient, the processor may (e.g., implementing functionality of the quantization module 125) save the quantization coefficient value to a memory location (e.g., at least one memory 110 and/or buffer 135) of the quantization coefficient block corresponding to a position of the transform coefficient in the transformed video data block.

One embodiment includes a method for encoding a block of video. The method includes processing, by a processor, in a reverse scan order, each of a plurality of transformed video data defining a transformed video data block, the reverse scan order being opposite a quantization scan order, identifying a position of a data value from the plurality of transformed video data that is greater than a magnitude of a variable, the magnitude of the variable being based on a compression quality level, processing in the quantization scan order and after the identifying, at least a portion of the plurality of transformed video data, and terminating the processing in the quantization scan order at the position of the data value.

Figure 7:
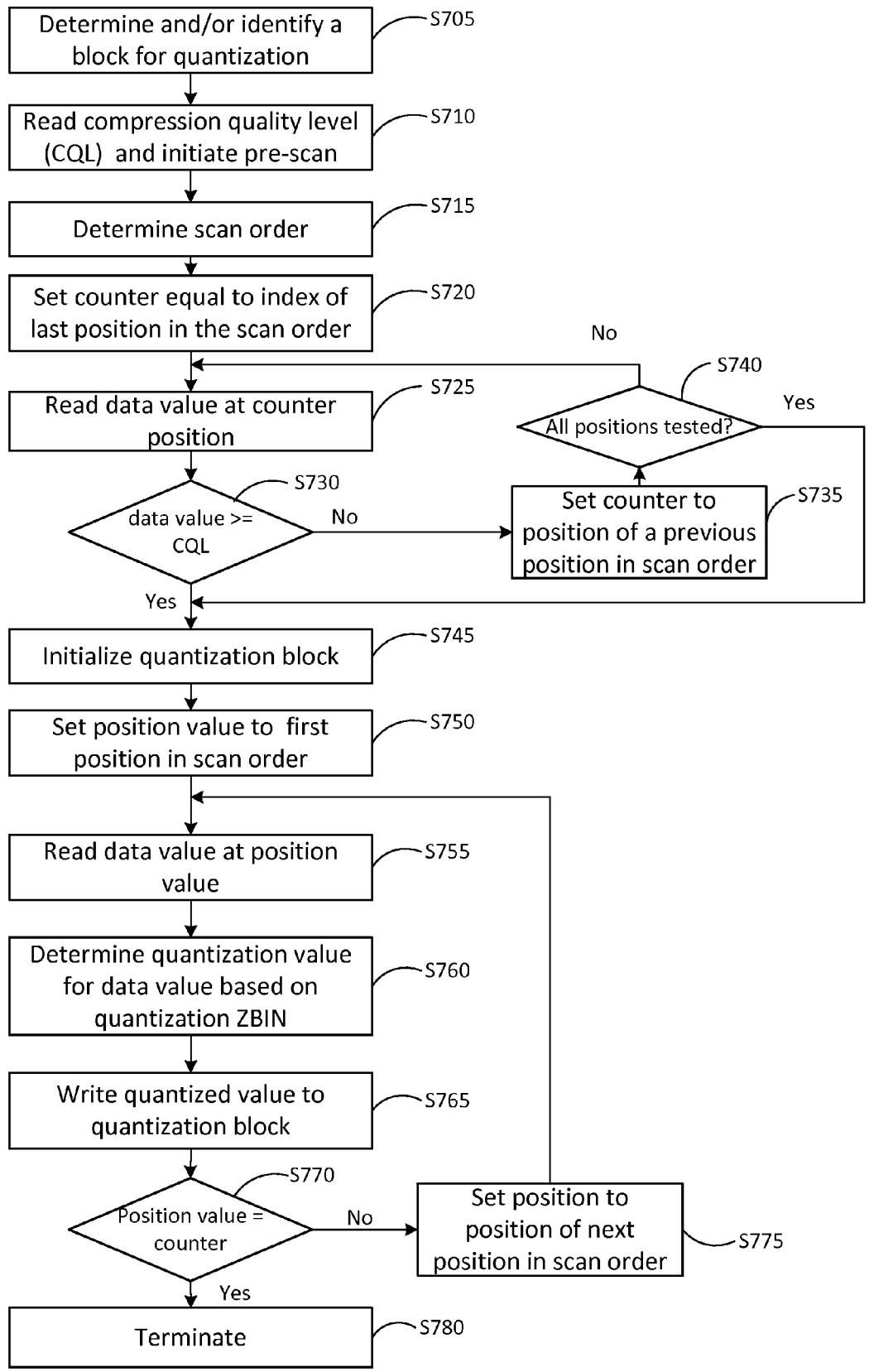
FIG. 7 illustrates another method for encoding a video data block according to at least one example embodiment.

FIG. 7 illustrates a method for encoding a video block according to at least one example embodiment. As shown in FIG. 7, in step S705 a processor (e.g., processor 105) determines and/or identifies a block for quantization. For example, a block for encoding may be a next block in a sequence of residual blocks of a streaming video (e.g., a video conference, movie and/or television show) for transmission over a wired and/or wireless communication system. The residual block may be transformed from a first domain (e.g., the time domain) to a second domain (e.g., the frequency domain) using one or more transform techniques, for example, a discrete cosine transform (DCT). The processor may save this transformed video data block in a memory (e.g., at least one memory 110) or a buffer (e.g., buffer 135) for additional processing. This saved transformed video data block may be determined as the block for quantization.

In step S710 the processor processes or reads a compression quality level (e.g., pre-scan ZBIN value) and initiates a pre-scan. For example, the processor (e.g., implementing functionality of the pre-scan module 120) may process or read the ZBIN value from ZBIN table(s) 130. The ZBIN value may be based on a compression quality level. For example, the processor may use a desired compression quality level to look-up a ZBIN value in ZBIN table(s) 130.

In step S715 the processor determines a scan order. For example, the scan order may be based on a quantization scan direction. The quantization scan direction may include scanning data values in the transformed video data block in a zigzag order. In a quantization scan of the transformed video data block, the scan direction (or scan order) may zigzag from low frequency transform data (e.g., the block indicated as position 0 in FIG. 5B) to high frequency transform data (e.g., the block indicated as position 63 in FIG. 5B) in a scan order (as indicated by the dashed line 555 in FIG. 5B). Therefore, referring to FIG. 5B the processor (e.g., implementing functionality of the pre-scan module 120) may determine the scan order as, for example, 0, 1, 8, 16, 9, 2, . . . , 63.

In step S720 the processor sets a counter equal to an index of a last position in the scan order. For example, again referring to FIG. 5B, the processor (e.g., implementing functionality of the pre-scan module 120) may set the counter equal to (or based on) position 63.

In step S725 the processor processes or reads a data value at the counter position. For example, the processor (e.g., implementing functionality of the pre-scan module 120) processes or reads a value (e.g., a byte of data) from memory corresponding to the counter. Referring to FIG. 4B, in this pre-scan of the transformed video data block, the first read may be at counter position 63, a second read may be at counter position 62, a third read may be at counter position 55, and so forth following dashed line 455.

In step S730 the processor determines if the data value is greater than (or greater than or equal to) the compression quality level (e.g., pre-scan ZBIN value). For example, the processor (e.g., implementing functionality of the pre-scan module 120) may compare the processed or read data value at the counter position to the pre-scan ZBIN value read from ZBIN table(s) 130. If the data value is greater than (or greater than or equal to) the compression quality level the pre-scan is terminated and processing continues to step S745. If the data value is not greater than (or greater than or equal to) the compression quality level the pre-scan continues and processing moves to step S735.

In step S735 the processor sets the counter to an index or position of a previous position in the scan order. For example, referring to FIG. 4B the processor (e.g., implementing functionality of the pre-scan module 120) may determine the pre-scan order (e.g., the reverse of the quantization scan order) as, for example, 63, 62, 55, 47, 54, 61, . . . , 0. Therefore, setting the counter to an index or position of a previous position in the scan order may include determining a current counter position (e.g., 55), evaluating the pre-scan order (e.g., the reverse of the quantization scan order), and selecting a next position in the pre-scan order (e.g., 47) as the counter. If counter equals the index of first position in the scan order, set counter to an invalid position. For example, set counter to −1.

In step S740 the processor determines if all positions in the transformed video data block have been tested (or pre-scanned). For example, if the value of the counter is an invalid position indicating the data value at first position in the scan order has been tested, all data values in the transformed video data block have been tested (or pre-scanned). Alternatively, the processor (e.g., implementing functionality of the pre-scan module 120) may determine a data value count (e.g., number of data values and/or number of transform coefficients and/or block size or count) of the transformed video data block, and maintain another variable that is incremented every time a data value is compared to the compression quality level (e.g., step S730). If the another variable is equal to the data value count, all data values in the transformed video data block have been tested (or pre-scanned). If all data values in the transformed video data block have been tested (or pre-scanned), processing continues to step S745 and the pre-scan is terminated. Otherwise, processing continues to step S725 and the pre-scan continues.

In step S745 the processor initializes a quantization block. For example, the processor (e.g., implementing functionality of the quantization module 125) may generate a block with dimensions the same as the transformed video data block. The processor may store the block in a memory (e.g., at least one memory 110) or a buffer (e.g., buffer 135). For example, the processor may reserve a block of memory in at least one memory 110 and associate the block of memory (e.g., assign a handle, name or pointer) to the quantization coefficient block. The processor may set quantization coefficients of the quantization coefficient block to a default value for all (substantially all or most) data values of the generated quantization coefficient block. For example, the processor may set each data value stored or reserved in memory and associated with the quantization coefficient block to the default value. The default value may be zero (0). Initialization may include determining if there is data to be quantized. If there is no data to be quantized, the process may terminate. For example, the processor may check if the counter position is valid. If the counter position is not valid, for example, counter equals −1, there is no data to be quantized, and the quantization process is terminated. Alternatively, determining if there is data to be done prior to quantization. For example, determining if there is data to be quantized may be performed after transforming video data.

In step S750 the processor sets an index or position value to a first position in the scan order. For example, again referring to FIG. 5B, the processor (e.g., implementing functionality of the quantization module 125) may set the index or position value equal to 0.

In step S755 the processor processes or reads a data value at the index position. For example, the processor (e.g., implementing functionality of the quantization module 125) processes or reads a value (e.g., a byte of data) from memory corresponding to the index or position value. Referring to FIG. 5B, in this quantization scan of the transformed video data block, the first read may be at counter position 0, a second read may be at counter position 1, a third read may be at counter position 8, and so forth following dashed line 555.

In step S760 the processor determines a quantization value for the data value based on a quantization ZBIN value. For example, the processor may quantize (e.g., implementing functionality of the quantization module 125) the processed or read data value based on the value of the data value, a quantization ZBIN value (as read from ZBIN table(s) 130) and a quantization algorithm. The quantization ZBIN value (as read from ZBIN table(s) 130) may be adjusted based on a boost value (e.g., a number based on the number of continuous zero quantized transform coefficients since the last non-zero quantized transform coefficient). The quantization algorithm may be, for example, a mapping of a large set of input values (e.g., transform coefficients) to a smaller set of values (e.g., rounding values to some unit of precision and/or compressing a range of values to a single quantum value). In other words, the quantization algorithm may map a range of transform coefficients to a single value. The mapping may be based on the quantization parameter Q and the quantization ZBIN value (e.g., a size of the range may be based on the quantization parameter Q and the quantization ZBIN value).

In step S765 the processor writes the quantization value to the quantization block. For example, as the processor quantizes each coefficient, the processor may (e.g., implementing functionality of the quantization module 125) save the quantization coefficient value to a memory location (e.g., at least one memory 110 and/or buffer 135) of the quantization coefficient block corresponding to a position of the transform coefficient in the transformed video data block.

In step S770 the processor determines if the index or position value is equal to the counter value. For example, the processor (e.g., implementing functionality of the quantization module 125) may process or read the current value of counter. The current value of counter indicates the data value position in the transformed video data block that, during the pre-scan, was determined to include a transform coefficient greater than (or greater than or equal to) the compression quality level (e.g., pre-scan ZBIN value). Therefore, according to example embodiments, the transform coefficient corresponding to the counter position is the last transform coefficient to be quantized. If the index or position value is equal to the counter value, processing continues to step S780 and the quantization process terminates. Otherwise, the quantization of the transformed video data block continues and processing moves to step S775 and then returns to step S755.

In step S775 the processor sets the index or position value to the index or position value of the next position in the scan order. For example, referring to FIG. 5B the processor (e.g., implementing functionality of the quantization module 125) may determine the quantization scan order as, for example, 0, 1, 8, 16, 9, 2, . . . , 63. Therefore, setting the index or position value to an index or position value of a next position in the scan order may include determining a current counter position (e.g., 16), evaluating the quantization scan order, and selecting a next position in the quantization scan order (e.g., 9) as the index or position value. Processing then returns to step S755.

One embodiment includes a method for encoding a block of video. The method includes processing, by a processor, in a scan order, each of a plurality of transformed video data defining a transformed video data block, storing a data value pair including a first value indicating a scan order position and a second value associated with a video data of the plurality of transformed video data at the scan order position to a memory upon determining the second value is greater than a magnitude of a variable, the magnitude of the variable being based on a compression quality level, processing each of the data value pairs, and setting one of a plurality of quantized data values of a quantization coefficient data block based on the processed data value pairs.

Figure 8:
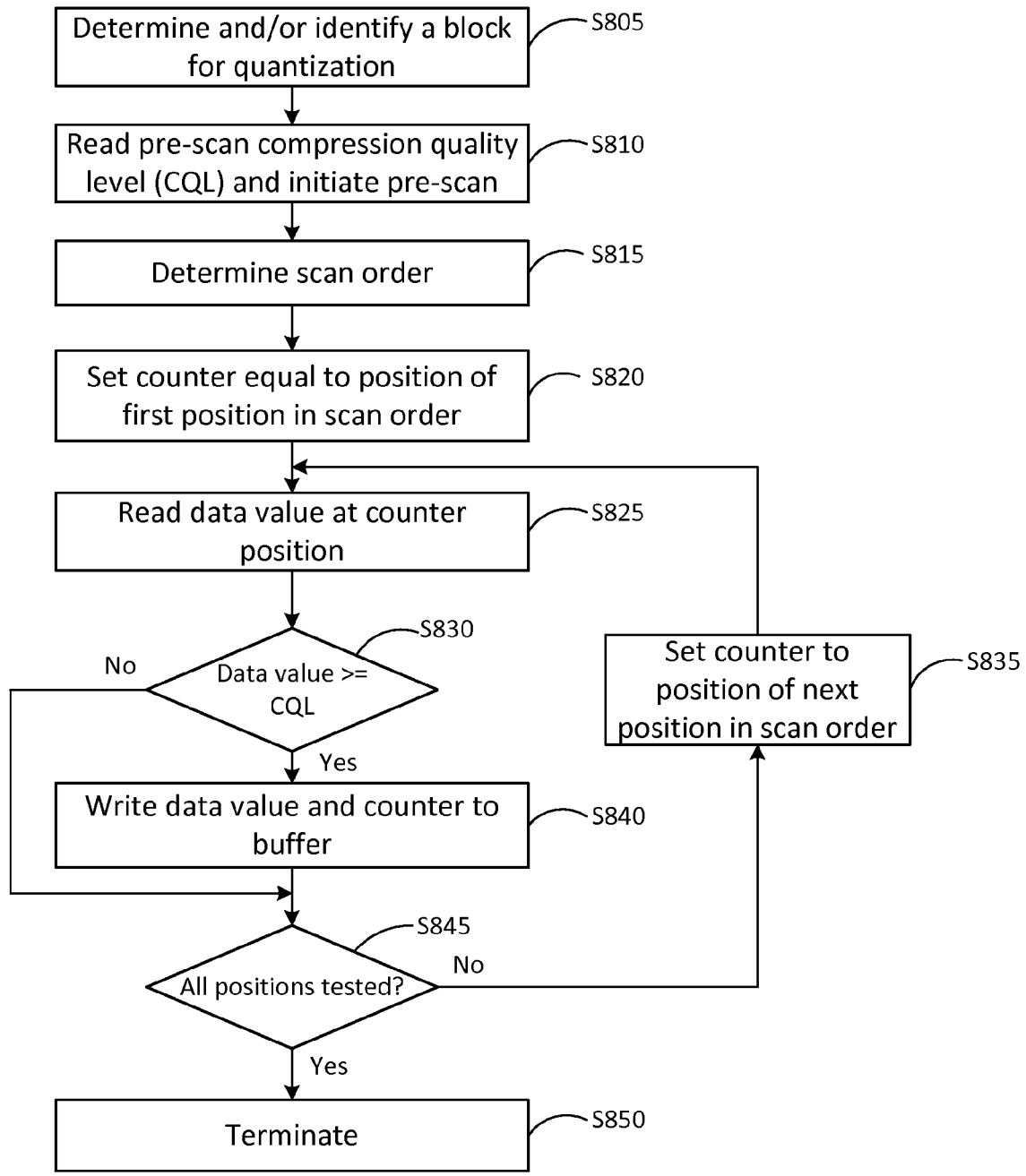
FIG. 8 illustrates the pre-scan pass of another method for encoding a video data block according to at least one example embodiment.

FIG. 8 illustrates the pre-scan pass of a method for encoding a video block according to at least one example embodiment. In some applications, the nonzero quantized coefficients are sparse. For example, some videos have background with low or no motion. Another example is that, for large transform size such as 32×32, there are only a small number of nonzero quantized coefficients existing in most cases. This method transfers sparse data to condensed data to speed up the process. As shown in FIG. 8, in step S805 a processor (e.g., processor 105) determines and/or identifies a block for quantization. For example, a block for encoding may be a next block in a sequence of residual blocks of a streaming video (e.g., a video conference, movie and/or television show) for transmission over a wired and/or wireless communication system. The residual block may be transformed from a first domain (e.g., the time domain) to a second domain (e.g., the frequency domain) using one or more transform techniques, for example, a discrete cosine transform (DCT). The processor may save this transformed video data block in a memory (e.g., at least one memory 110) or a buffer (e.g., buffer 135) for additional processing. This saved transformed video data block may be determined as the block for quantization.

In step S810 the processor processes or reads a compression quality level (e.g., pre-scan ZBIN value) and initiates a pre-scan. For example, the processor (e.g., implementing functionality of the pre-scan module 120) may read the ZBIN value from ZBIN table(s) 130. The ZBIN value may be based on a compression quality level. For example, the processor may use a desired compression quality level to look-up a ZBIN value in ZBIN table(s) 130.

In step S815 the processor determines a scan order. For example, the scan order may be based on a quantization scan direction. The quantization scan direction may include scanning data values (e.g., data stored as bits and/or bytes) in the transformed video data block in a zigzag order. In a quantization scan of the transformed video data block, the scan direction (or scan order) may zigzag from low frequency transform data (e.g., the block indicated as data value 0 in FIG. 5B) to high frequency transform data (e.g., the block indicated as data value 63 in FIG. 5B) in a scan order (as indicated by the dashed line 555 in FIG. 5B). Therefore, referring to FIG. 5B the processor (e.g., implementing functionality of the pre-scan module 120) may determine the scan order as, for example, 0, 1, 8, 16, 9, 2, . . . , 63.

In step S820 the processor sets a counter equal to an index or position of a first position in the scan order. For example, again referring to FIG. 5B, the processor (e.g., implementing functionality of the pre-scan module 120) may set the counter equal to 0. Alternatively, this pre-scan is done in a reverse scan order. Therefore, the counter may be set to an index or position of the last position in the scan order. Therefore, the counter may be set to 63. Alternatively, the scan order is disregarded and the pre-scan may be performed sequentially (e.g., 0, 1, 2, 3, . . . ). In this case, the counter may be set to 0 as well.

In step S825 the processor processes or reads a data value at the counter position. For example, the processor (e.g., implementing functionality of the pre-scan module 120) processes or reads a value (e.g., a byte of data) from memory corresponding to the counter. Referring to FIG. 5B, in this pre-scan of the transformed video data block, the first read may be at counter position 0, a second read may be at counter position 1, a third read may be at counter position 8, and so forth following dashed line 555.

In step S830 the processor determines if the data value is greater than (or greater than or equal to) the compression quality level (e.g., pre-scan ZBIN value). For example, the processor (e.g., implementing functionality of the pre-scan module 120) may compare the processed or read data value at the counter position to the pre-scan ZBIN value read from ZBIN table(s) 130. If the data value is greater than (or greater than or equal to) the compression quality level processing continues to step S840. If the data value is not greater than (or greater than or equal to) the compression quality level the pre-scan continues and processing moves to step S845.

In step S840 the processor writes the data value and counter to a buffer. For example, the processor (e.g., implementing functionality of the pre-scan module 120) may save the counter as a data value position or index (e.g., of a transform coefficient to be quantized) and a transform coefficient value (e.g., the read data value) to a buffer (e.g., buffer 135) upon determining the data value is greater than (or greater than or equal to) the quality value (e.g., compression quality level and/or ZBIN value).

In step S845 the processor determines if all positions in the transformed video data block have been tested (or pre-scanned). For example, the processor (e.g., implementing functionality of the pre-scan module 120) may determine a data value count (e.g., number of data values and/or number of transform coefficients and/or block size or count) of the transformed video data block. If the data value count is equal to the value of the counter plus one (counter+1) (assuming the last data value is tested last) all data values in the transformed video data block have been tested (or pre-scanned). Alternatively, the processor (e.g., implementing functionality of the pre-scan module 120) may maintain another variable that is incremented every time a data value is compared to the compression quality level (e.g., step S830). If the another variable is equal to the data value count, all data values in the transformed video data block have been tested (or pre-scanned). If all data values in the transformed video data block have been tested (or pre-scanned), processing continues to step S850 and the pre-scan is terminated. Otherwise, processing continues to step S835 and on to step S825 and the pre-scan continues.

In step S835 the processor sets the counter to an index or position of a next position in the scan order. For example, referring to FIG. 5B the processor (e.g., implementing functionality of the pre-scan module 120) may determine the pre-scan order (e.g., the quantization scan order) as, for example, 0, 1, 8, 16, 9, 2, . . . , 63. Therefore, setting the counter to an index or position of a next position in the scan order may include determining a current counter position (e.g., 55), evaluating the pre-scan order (e.g., the quantization scan order), and selecting a next position in the pre-scan order (e.g., 62) as the counter.

Alternatively, the pre-scan is not in a scan order. Therefore, the counter may be set to an index or position of the previous position in the scan order (e.g., reverse quantization scan order—for example, 63, 62, 55, 47, 54, 61, . . . , 0). Therefore, setting the counter to an index or position of a previous data value in the scan order may include determining a current counter position (e.g., 16), evaluating the scan order, and selecting a previous position in the pre-scan order (e.g., 8) as the counter. Alternatively, the scan order is disregarded and the pre-scan may be performed sequentially (e.g., 0, 1, 2, 3, . . . ). In this case, setting the counter to an index or position of a next position in the scan order may include determining a current counter position (e.g., 7), and selecting a next sequential number (e.g., 8) as the counter. Processing then returns to step S825. The pre-scan continues until all data values in the transformed video data block have been tested.

Figure 9:
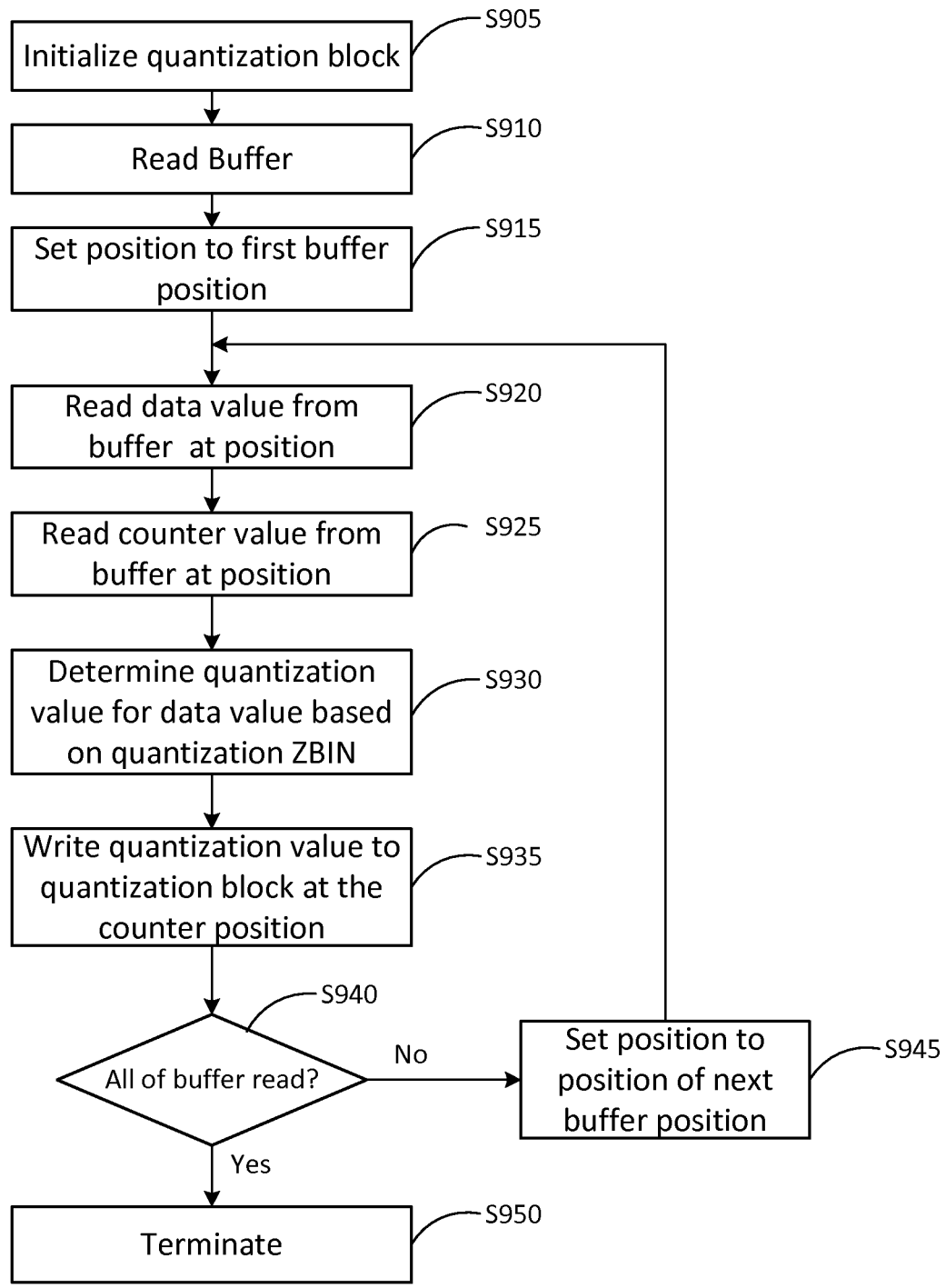
FIG. 9 illustrates yet the quantization pass of another method for encoding a video data block according to at least one example embodiment.

FIG. 9 illustrates the quantization pass of a method for encoding a video block according to at least one example embodiment. As shown in FIG. 9, in step S905 a processor (e.g., processor 105) initializes a quantization block. For example, the processor (e.g., implementing functionality of the quantization module 125) may generate a block with dimensions the same as the transformed video data block. The processor may store the block in a memory (e.g., at least one memory 110) or a buffer (e.g., buffer 135). For example, the processor may reserve a block of memory in at least one memory 110 and associate the block of memory (e.g., assign a handle, name or pointer) to the quantization coefficient block. The processor may set quantization coefficients of the quantization coefficient block to a default value for all (substantially all or most) data values (e.g., data stored as bits and/or bytes) of the generated quantization coefficient block. For example, the processor may set each data value stored or reserved in memory and associated with the quantization coefficient block to the default value. The default value may be zero (0).

In step S910 the processor checks if a buffer is empty. For example, the processor (e.g., implementing functionality of the quantization module 125) checks buffer 135. If the buffer is empty, there is no data to be quantized, and the quantization process is terminated. Otherwise, the processor processes or reads the buffer to determine a reserved block of memory (e.g., buffer 135) configured to store data value position or index and a transform coefficient value pairs. For example, the processor may process or read buffer 135 to determine a handle, name or pointer assigned to store data value position or index and a transform coefficient value pairs generated during a pre-scan.

In step S915 the processor sets an index or position value to an index or position of a first position in the buffer. For example, the processor (e.g., implementing functionality of the quantization module 125) may set the index or position value equal to 0 or a zero offset position associated with the handle, name or pointer assigned to the buffer (e.g., buffer 135).

In step S920 the processor processes or reads a data value from the buffer at the index position. For example, the processor (e.g., implementing functionality of the quantization module 125) processes or reads a value (e.g., a byte of data) from the buffer corresponding to the index or position value.

In step S925 the processor processes or reads a counter value as a data value position of the data value from the buffer at the index position. For example, the processor (e.g., implementing functionality of the quantization module 125) processes or reads a value (e.g., a byte of data) from the buffer corresponding to the index or position value.

In step S930 the processor determines a quantization value for the data value based on a quantization parameter Q, a quantization ZBIN value. For example, the processor may quantize (e.g., implementing functionality of the quantization module 125) the data value based on the value of the data value, a quantization parameter Q, a quantization ZBIN value (as read from ZBIN table(s) 130) and a quantization algorithm. The quantization ZBIN value (as read from ZBIN table(s) 130) may be adjusted based on a boost value (e.g., a number based on the number of continuous zero quantized transform coefficients since the last non-zero quantized transform coefficient). The quantization algorithm may be, for example, a mapping of a large set of input values (e.g., transform coefficients) to a smaller set of values (e.g., rounding values to some unit of precision and/or compressing a range of values to a single quantum value). In other words, the quantization algorithm may map a range of transform coefficients to a single value. The mapping may be based on the quantization parameter Q and the quantization ZBIN value (e.g., a size of the range may be based on the quantization parameter Q and the quantization ZBIN value).

In step S935 the processor writes the quantization value to the quantization block. For example, as the processor quantizes each coefficient, the processor may (e.g., implementing functionality of the quantization module 125) save the quantization coefficient value to a memory location (e.g., at least one memory 110 and/or buffer 135) of the quantization coefficient block corresponding to counter values as the data value position of the transform coefficient in the transformed video data block.

In step S940 the processor determines if all data value position or index and a transform coefficient value pairs have been processed or read. For example, the processor (e.g., implementing functionality of the quantization module 125) may determine a data value count (e.g., number of data values and/or number of data value position or index and a transform coefficient value pairs) of the buffer. If the data value count is equal to the value of the index or position plus one (counter+1), all of the data value position or index and a transform coefficient value pairs have been processed or read. If all of the data value position or index and a transform coefficient value pairs have been processed or read, processing continues to step S950 and the quantization process terminates. Otherwise processing moves to step S945 and returns to step S920 in order to continue the quantization process.

In step S945 the processor sets the index or position value to the index position of the next data value in the buffer. For example, the processor (e.g., implementing functionality of the quantization module 125) may set the index or position value to an index or position value of a next position in the scan order by determining a current index position (e.g., 7), and selecting a next sequential position (e.g., 8) as the index or position value. Processing then returns to step S920.

The method steps described above with regard to FIGS. 2 and 6-9 may be executed repeatedly. For example, a first or pre-scan pass may be performed one or more time utilizing a different pre-scan ZBIN value each time the pre-scan is performed. Accordingly, a pre-scan pass may be performed including a selection of a pre-scan ZBIN value based on the described parameters. A second or subsequent pre-scan pass may be performed including a selection of a different pre-scan ZBIN value based on a modification of the described parameters.

In addition, a second or quantization pass may be performed one or more time utilizing a different quantization ZBIN value each time the quantization is performed. Accordingly, a quantization pass may be performed including a selection of a quantization ZBIN value based on the described parameters. A second or subsequent quantization pass may be performed including a selection of a different quantization ZBIN value based on a modification of the described parameters.

Further, both the first or pre-scan pass and the second or quantization pass may be performed in order such that a different pre-scan ZBIN value is used each time the pre-scan is performed and a different quantization ZBIN value is used each time the quantization is performed. Accordingly, a pre-scan pass and a quantization pass may be performed including a selection of pre-scan ZBIN value and a quantization ZBIN value based on the described parameters. A second or subsequent pre-scan pass and quantization pass may be performed including a selection of a different pre-scan ZBIN value and quantization ZBIN value based on a modification of the described parameters.

Figure 10:
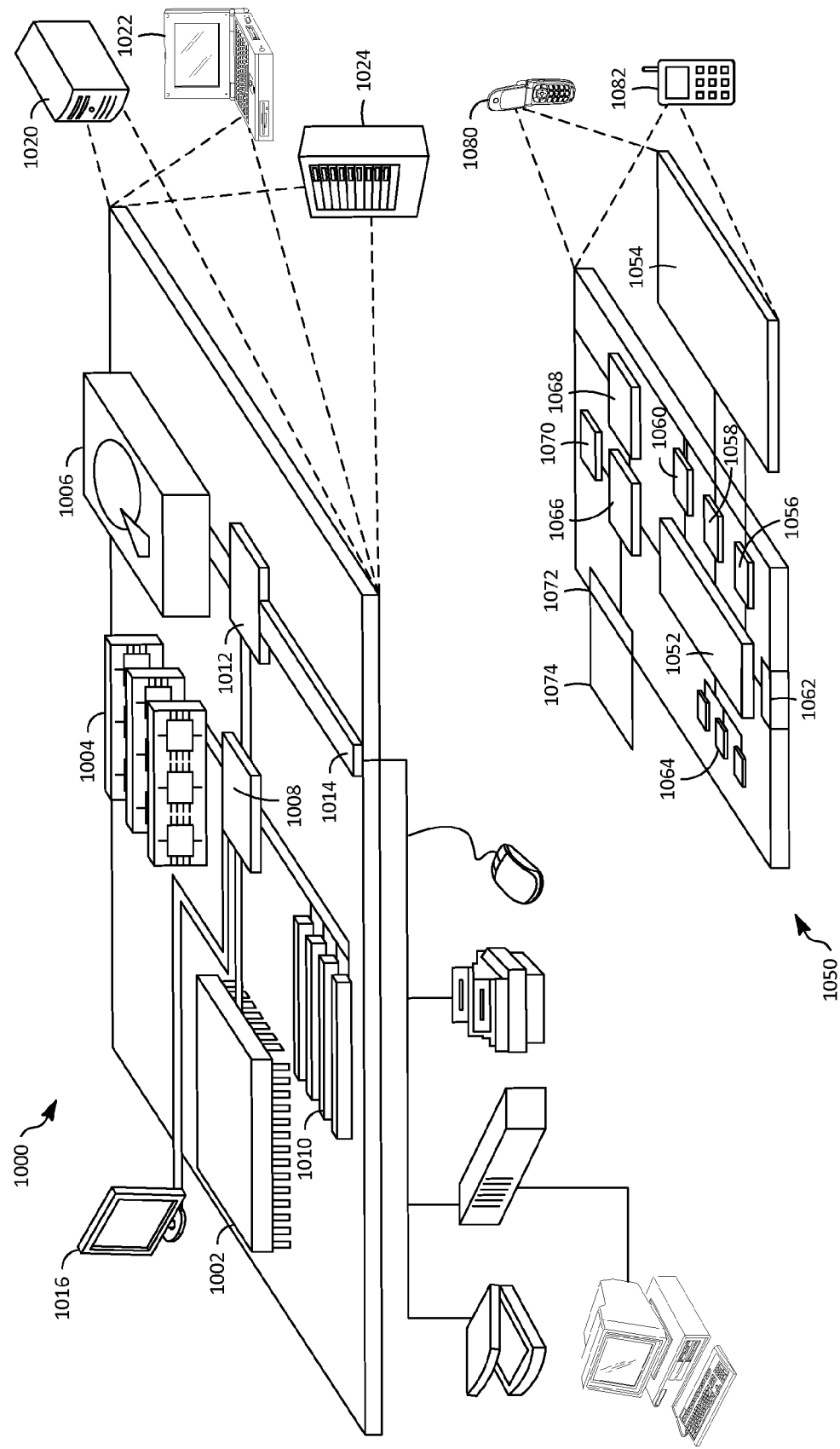
FIG. 10 illustrates an example of a computer device and a mobile computer device that can be used to implement the techniques described herein.

FIG. 10 shows an example of a generic computer device 1000 and a generic mobile computer device 1050, which may be used with the techniques described here. Computing device 1000 is intended to represent various forms of digital computers, such as laptops, desktops, workstations, personal digital assistants, servers, blade servers, mainframes, and other appropriate computers. Computing device 1050 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 1000 includes a processor 1002, memory 1004, a storage device 1006, a high-speed interface 1008 connecting to memory 1004 and high-speed expansion ports 1010, and a low speed interface 1012 connecting to low speed bus 1014 and storage device 1006. Each of the components 1002, 1004, 1006, 1008, 1010, and 1012, are interconnected using various busses, and may be mounted on a common motherboard or in other manners as appropriate. The processor 1002 can process instructions for execution within the computing device 1000, including instructions stored in the memory 1004 or on the storage device 1006 to display graphical information for a GUI on an external input/output device, such as display 1016 coupled to high speed interface 1008. In other implementations, multiple processors and/or multiple buses may be used, as appropriate, along with multiple memories and types of memory. Also, multiple computing devices 1000 may be connected, with each device providing portions of the necessary operations (e.g., as a server bank, a group of blade servers, or a multi-processor system).

The memory 1004 stores information within the computing device 1000. In one implementation, the memory 1004 is a volatile memory unit or units. In another implementation, the memory 1004 is a non-volatile memory unit or units. The memory 1004 may also be another form of computer-readable medium, such as a magnetic or optical disk.

The storage device 1006 is capable of providing mass storage for the computing device 1000. In one implementation, the storage device 1006 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 1004, the storage device 1006, or memory on processor 1002.

The high speed controller 1008 manages bandwidth-intensive operations for the computing device 1000, while the low speed controller 1012 manages lower bandwidth-intensive operations. Such allocation of functions is exemplary only. In one implementation, the high-speed controller 1008 is coupled to memory 1004, display 1016 (e.g., through a graphics processor or accelerator), and to high-speed expansion ports 1010, which may accept various expansion cards (not shown). In the implementation, low-speed controller 1012 is coupled to storage device 1006 and low-speed expansion port 1014. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 1000 may be implemented in a number of different forms, as shown in the figure. For example, it may be implemented as a standard server 1020, or multiple times in a group of such servers. It may also be implemented as part of a rack server system 1024. In addition, it may be implemented in a personal computer such as a laptop computer 1022. Alternatively, components from computing device 1000 may be combined with other components in a mobile device (not shown), such as device 1050. Each of such devices may contain one or more of computing device 1000, 1050, and an entire system may be made up of multiple computing devices 1000, 1050 communicating with each other.

Computing device 1050 includes a processor 1052, memory 1064, an input/output device such as a display 1054, a communication interface 1066, and a transceiver 1068, among other components. The device 1050 may also be provided with a storage device, such as a microdrive or other device, to provide additional storage. Each of the components 1050, 1052, 1064, 1054, 1066, and 1068, are interconnected using various buses, and several of the components may be mounted on a common motherboard or in other manners as appropriate.

The processor 1052 can execute instructions within the computing device 1050, including instructions stored in the memory 1064. The processor may be implemented as a chipset of chips that include separate and multiple analog and digital processors. The processor may provide, for example, for coordination of the other components of the device 1050, such as control of user interfaces, applications run by device 1050, and wireless communication by device 1050.

Processor 1052 may communicate with a user through control interface 1058 and display interface 1056 coupled to a display 1054. The display 1054 may be, for example, a TFT LCD (Thin-Film-Transistor Liquid Crystal Display) or an OLED (Organic Light Emitting Diode) display, or other appropriate display technology. The display interface 1056 may comprise appropriate circuitry for driving the display 1054 to present graphical and other information to a user. The control interface 1058 may receive commands from a user and convert them for submission to the processor 1052. In addition, an external interface 1062 may be provide in communication with processor 1052, so as to enable near area communication of device 1050 with other devices. External interface 1062 may provide, for example, for wired communication in some implementations, or for wireless communication in other implementations, and multiple interfaces may also be used.

The memory 1064 stores information within the computing device 1050. The memory 1064 can be implemented as one or more of a computer-readable medium or media, a volatile memory unit or units, or a non-volatile memory unit or units. Expansion memory 1074 may also be provided and connected to device 1050 through expansion interface 1072, which may include, for example, a SIMM (Single In Line Memory Module) card interface. Such expansion memory 1074 may provide extra storage space for device 1050, or may also store applications or other information for device 1050. Specifically, expansion memory 1074 may include instructions to carry out or supplement the processes described above, and may include secure information also. Thus, for example, expansion memory 1074 may be provide as a security module for device 1050, and may be programmed with instructions that permit secure use of device 1050. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 1064, expansion memory 1074, or memory on processor 1052 that may be received, for example, over transceiver 1068 or external interface 1062.

Device 1050 may communicate wirelessly through communication interface 1066, which may include digital signal processing circuitry where necessary. Communication interface 1066 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 1068. In addition, short-range communication may occur, such as using a Bluetooth, Wi-Fi, or other such transceiver (not shown). In addition, GPS (Global Positioning System) receiver module 1070 may provide additional navigation- and location-related wireless data to device 1050, which may be used as appropriate by applications running on device 1050.

Device 1050 may also communicate audibly using audio codec 1060, which may receive spoken information from a user and convert it to usable digital information. Audio codec 1060 may likewise generate audible sound for a user, such as through a speaker, e.g., in a handset of device 1050. Such sound may include sound from voice telephone calls, may include recorded sound (e.g., voice messages, music files, etc.) and may also include sound generated by applications operating on device 1050.

The computing device 1050 may be implemented in a number of different forms, as shown in the figure. For example, it may be implemented as a cellular telephone 1080. It may also be implemented as part of a smart phone 1082, personal digital assistant, or other similar mobile device.

Some of the above example embodiments are described as processes or methods depicted as flowcharts. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Methods discussed above, some of which are illustrated by the flow charts, may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a storage medium. A processor(s) may perform the necessary tasks.

Specific structural and functional details disclosed herein are merely representative for purposes of describing example embodiments. Example embodiments, however, be embodied in many alternate forms and should not be construed as limited to only the embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two figures shown in succession may in fact be executed concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of the above example embodiments and corresponding detailed description are presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In the above illustrative embodiments, reference to acts and symbolic representations of operations (e.g., in the form of flowcharts) that may be implemented as program modules or functional processes include routines, programs, objects, components, data structures, etc., that perform particular tasks or implement particular abstract data types and may be described and/or implemented using existing hardware at existing structural elements. Such existing hardware may include one or more Central Processing Units (CPUs), digital signal processors (DSPs), application-specific-integrated-circuits, field programmable gate arrays (FPGAs) computers or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the example embodiments are typically encoded on some form of non-transitory program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The example embodiments not limited by these aspects of any given implementation.

Lastly, it should also be noted that whilst the accompanying claims set out particular combinations of features described herein, the scope of the present disclosure is not limited to the particular combinations hereafter claimed, but instead extends to encompass any combination of features or embodiments herein disclosed irrespective of whether or not that particular combination has been specifically enumerated in the accompanying claims at this time.

What is claimed is:

1. A method for encoding a block of video, the method comprising:
   storing a first plurality of values based on a first quantization parameter in a first table;
   storing a second plurality of values based on a second quantization parameter in a second table;
   identifying, by a processor, a transformed video data block including a plurality of transformed video data;
   during a first scan, by the processor, of the transformed video data block:
      identifying a first portion of the plurality of transformed video data, the first portion of the plurality of transformed video data having transformation coefficients that are at or below a compression quality level based on one of the first plurality of values stored in the first table;
      identifying a second portion of the plurality of transformed video data the second portion of the plurality of transformed video data having transformation coefficients that are above the compression quality level based on one of the first plurality of values stored in the first table; and
      stopping the first scan at a data position of the plurality of transformed video data having a transform coefficient value above the compression quality level;
   during a second scan, by the processor, of the transformed video data block:
      generating a quantization coefficient data block including a plurality of quantized data values each of the plurality of quantized data values being set to a default value;
      while scanning in a direction of the second scan, changing a portion of the plurality of quantized data values in the quantization coefficient data block to a quantized value based on the second portion of the plurality of transformed video data and a value stored in the second table scaled based on a number of continuous zero quantized values since a last non-zero quantized value, each position in the quantization coefficient data block corresponding to the second portion of the plurality of transformed video data; and
      stopping the second scan at the data position of the plurality of transformed video data having the transform coefficient value above the compression quality level.

2. The method of claim 1, wherein
   the first scan is performed in a reverse scan order, the reverse scan order being sequentially opposite to a quantization scan order; and
   the identifying the first portion of the plurality of transformed video data includes:
   upon determining at least one of the plurality of transformed video data is above the compression quality level based on one of the first plurality of values stored in the first table, storing a position associated with the at least one of the plurality of transformed video data that is above the compression quality level based on one of the first plurality of values stored in the first table and terminating processing of the first scan.

3. The method of claim 1, wherein
   the first scan is performed in a reverse scan order, the reverse scan order being sequentially opposite to a quantization scan order; and
   upon determining at least one of the plurality of transformed video data is above the compression quality level based on one of the first plurality of values stored in the first table, storing a position associated with the at least one of the plurality of transformed video data that is above the compression quality level based on one of the first plurality of values stored in the first table and terminating processing of the first scan; and
   identifying the second portion of the plurality of transformed video data as including an unprocessed, during the first scan, portion of the plurality of transformed video data.

4. The method of claim 1, wherein the first table is a pre-scan ZBIN table.

5. The method of claim 1, wherein the plurality of transformed video data are video transform coefficients.

6. The method of claim 1, wherein generating the quantization coefficient data block includes:
   determining a last scan position in a quantization scan order, the last scan position being determined during the first scan of the transformed video data block, the last scan position identifying a position, in the transformed video data block, between the first portion of the plurality of transformed video data and the second portion of the plurality of transformed video data;
   processing the plurality of transformed video data in the quantization scan order; and
   terminating the processing at the last scan position.

7. The method of claim 1, wherein generating the quantization coefficient data block includes;
   reading a buffer including positions of the quantization coefficient data block and values to be quantized;
   quantizing each of the values to be quantized; and
   setting the quantized value to one of the plurality of quantized data values based on a position of the quantization coefficient data block and the second plurality of values stored in the second table.

8. The method of claim 1, wherein
   the first quantization parameter is based on a target video quality and a target compression level.

9. The method of claim 1, wherein
   the second quantization parameter is based on a target video quality, a target compression level, and a target bandwidth for transmission.

10. A method for encoding a block of video, the method comprising:
    storing a first plurality of values based on a first quantization parameter in a first table;
    storing a second plurality of values based on a second quantization parameter in a second table;
    during a first scan, by a processor, of a transformed video data block:

processing, by the processor, in a reverse scan order, each of a plurality of transformed video data defining a transformed video data block, the reverse scan order being opposite a quantization scan order;

identifying a position of a data value from the plurality of transformed video data that is greater than a magnitude of a variable based on one of the first plurality of values stored in the first table, the magnitude of the variable being based on a compression quality level;

after the identifying of the position of the data value, stopping the first scan;

during a second scan, by the processor, of the transformed video data block:

generating a quantization coefficient data block including a plurality of quantized data values each of the plurality of quantized data values being set to a default value;

while processing in the quantization scan order, set a portion of the plurality of quantized data values in the quantization coefficient data block to a quantized value based on a portion of the plurality of transformed video data and a value stored in the second table scaled based on a number of continuous zero quantized values since a last non-zero quantized value, each position in the quantization coefficient data block corresponding to the portion of the plurality of transformed video data; and while processing in the quantization scan order, terminating the processing in the quantization scan order at the position of the data value and stopping the second scan.

11. The method of claim 10, wherein the plurality of transformed video data are video transform coefficients.

12. A method for encoding a block of video, the method comprising:

storing a first plurality of values based on a first quantization parameter in a first table;

storing a second plurality of values based on a second quantization parameter in a second table;

during a first scan, by a processor, of a transformed video data block:

processing, by the processor, in a scan order, each of a plurality of transformed video data defining a transformed video data block;

storing a data value pair including a first value indicating a scan order position and a second value associated with a video data of the plurality of transformed video data at the scan order position to a memory upon determining the second value is greater than a magnitude of a variable based on one of the first plurality of values stored in the first table, the magnitude of the variable being based on a compression quality level; and stopping the first scan at a data position of the plurality of transformed video data having a transform coefficient value above the compression quality level; and during a second scan, by the processor, of the transformed video data block:

generating a quantization coefficient data block including a plurality of quantized data values each of the plurality of quantized data values being set to a default value;

processing each of the data value pairs;

while processing each of the data value pairs, set a portion of the plurality of quantized data values in the quantization coefficient data block to a quantized value based on a portion of the plurality of transformed video data and a value stored in the second table scaled based on a number of continuous zero quantized values since a last non-zero quantized value, each position in the quantization coefficient data block corresponding to the portion of the plurality of transformed video data; and while processing each of the data value pairs, stopping the second scan at the data position of the plurality of transformed video data having a transform coefficient value above the compression quality level.

13. The method of claim 12, wherein setting the one of the plurality of quantized data values includes, for each of the data value pairs, storing the quantized value at a position in the quantization coefficient data block based on the first value.

14. The method of claim 12, wherein setting the data value in the quantization coefficient data block includes, for each of the data value pairs, replacing the default value at a position in the quantization coefficient data block based on the first value with the quantized value.

15. The method of claim 12, wherein the second value is a video transform coefficient.

* * * * *